United States Patent [19]

Lange

[11] Patent Number: 5,094,360
[45] Date of Patent: Mar. 10, 1992

[54] SCREEN BASKET

[75] Inventor: Werner Lange, Nattheim, Fed. Rep. of Germany

[73] Assignee: J. M. Voith GmbH, Heidenheim, Fed. Rep. of Germany

[21] Appl. No.: 661,384

[22] Filed: Feb. 26, 1991

Related U.S. Application Data

[63] Continuation-in-part of Ser. No. 607,600, Oct. 31, 1990, which is a continuation of Ser. No. 570,392, Aug. 21, 1990, abandoned.

[30] Foreign Application Priority Data

Aug. 23, 1989 [DE] Fed. Rep. of Germany ....... 3927748

[51] Int. Cl.⁵ .............................................. B23K 31/02
[52] U.S. Cl. ................................. 220/485; 29/163.6; 228/182; 209/411
[58] Field of Search ........................ 220/485, 493, 494; 403/400, 356, 384, 346; 29/163.6, 163.7; 228/182; 209/411

[56] References Cited

U.S. PATENT DOCUMENTS

| | | | |
|---|---|---|---|
| 225,919 | 3/1880 | Cobb | 29/163.6 |
| 1,636,592 | 7/1927 | Cushwa | 29/163.6 |
| 3,469,300 | 9/1969 | Nagin | 29/163.6 |
| 3,979,856 | 9/1976 | Belchew | 220/485 |
| 4,250,664 | 2/1981 | Remke | 220/485 |
| 4,526,285 | 7/1985 | Cerveny et al. | 220/485 |
| 5,011,065 | 4/1991 | Musselmann | 228/170 |

FOREIGN PATENT DOCUMENTS

0182688 10/1985 European Pat. Off. .

Primary Examiner—Joseph Man-Fu Moy
Attorney, Agent, or Firm—Baker & Daniels

[57] ABSTRACT

The invention concerns screen baskets featuring axially parallel screen rods with screen slots contained in between and, for support of the screen rods, rings that are coaxial with the basket axis, the rings being provided with recesses that are open toward the rim. The screen rods may have feet that are placed and fastened in the recesses. The screen rods are placed in the recesses while the rings do not have their final rounded shape. The rings are rounded so as to close the circular shape and to clamp the screen rods in place in the recesses that are constricted by the rounding.

27 Claims, 7 Drawing Sheets

SCREEN BASKET

CROSS-REFERENCE TO RELATED APPLICATIONS

This application is a Continuation-In-Part of application Ser. No. 07/607,600 filed Oct. 31, 1990 still pending which is a continuation of application Ser. No. 07/570,392, filed Aug. 21, 1990 now abandoned.

BACKGROUND OF THE INVENTION

The invention concerns rotationally symmetric screen baskets featuring axially parallel bars with screen slots contained in between, and featuring rings that are coaxial to the basket axis for support of the bars, where the rings are provided with recesses open toward the rim of the rings, and the feet of the bars are placed in the recesses and fastened. Such screen baskets and processes for making them are known from the German patent disclosure 33 27 422.

The attachment of the bars to the rings may be very expensive to manufacture. The bars are generally fastened on the rings by welding. This involves several disavantages: the welding sets up stresses in the material causing a warping of the entire screen basket; the fastening is not sufficiently safe, since the welding seams may split in the course of time; the fabrication is unwieldy and time-consuming; and, it is relatively difficult to accurately adjust the width of the screen slot between two adjacent bars.

The problem underlying the invention is to provide a screen basket which is not associated with the said disadvantages, and to provide screen baskets whose manufacture is correspondingly more favorable. In detail, this is to be accomplished by avoiding the said welding stresses, in that the fastening is marked by greater safety, the screen slots can be adjusted more accurately, and the manufacture becomes simpler and more cost-efficient.

SUMMARY OF THE INVENTION

This problem is solved by the features of the present invention. The screen basket is of the type having axially parallel bars with screen slots therebetween. The basket further has an axis and includes rings for support of the bars. The rings are coaxial to the basket axis, have an inner rim, and are provided with recesses which open toward the rim. The bars may be provided with feet whereby the feet are positioned and fastened in said recesses.

In one embodiment, the invention comprises a screen basket wherein a plurality of screen rods having screen slots therebetween is provided. The screen rods extend generally along a cylinder circumference surface of the basket and are axially parallel to the center axis of the basket. Each of the screen rods has a radially outer foot part and has a head part projecting radially inwardly from the foot part. Each of the head parts includes a transition part at the juncture wherein the head part is joined to the foot part. The head parts further have respective side surfaces which are tilted between about 7 degrees to about 18 degrees relative to the respective radial of the screen basket. The head parts have respective cross sectional dimensions whereby the cross sectional dimensions increase in the radially inward direction. The transition parts and the foot parts have respective cross sectional dimensions in circumferential direction wherein the cross sectional dimension of each of the transition parts is at least 0.6 mm less than the maximum cross sectional dimension of the foot parts. A plurality of retaining rings supporting the bars is also provided. The rings have an inner rim and extend circumferentially around the cylinder circumference surface. The rings are mutually spaced and generally coaxial to the axis. The rings are provided with recesses which open toward the rim. The foot parts are positioned in the recesses.

The present invention, in accordance with another embodiment comprises a screen basket wherein a plurality of screen rods having screen slots therebetween is provided. The screen rods extend generally along a cylinder circumference surface of the basket and are axially parallel to the center axis of the basket. A plurality of retaining rings extending along the cylinder circumference surface for supporting said screen rods is provided. The rings are formed from bodies whereby the bodies are rounded into rings. The rings are coaxial to the axis and are spaced generally equidistant from each other along the axis. The rings further have an inner rim and are provided with recesses which open toward the rim. The screen rods are adapted to be placed in the recesses prior to the rounding of the rings so that the rods are clamped into position in the recesses. Each of the screen rods has side surfaces which in relation to the radial center line of the cross sections of the screen rod are tilted such that the cross section decreases generally in a uniform manner from radially inside to radially outside. The side surfaces may include either recesses or projections on one or both sides of said radial center line.

The present invention, in accordance with yet another embodiment, comprises a process for the manufacture of a rotationally symmetric screen basket having axially parallel screen rods aligned so that screen slots are defined therebetween. The screen basket further has an axis, and includes rings for support of the screen rods, said rings being coaxial with the axis. Each of the rings has an inner rim, and is provided with a recess which opens toward said rim. The screen rods are positioned and fastened in said recesses. In particular, the process comprises the following steps: 1) providing substantially elongated retaining rods to be rounded into the rings, said retaining rods having said recesses formed therein; 2) placing the screen rods into the recesses prior to rounding the retaining rods into rings, said screen rods being placed in said recesses by inserting them into the recesses in transverse direction with respect to the retaining rods, one after the other, by plugging them into the recesses of all the rods so that the screen rods are retained in said recesses as a catchlock; 3) rounding the retaining rods into rings so that the recesses are narrowed, whereby the screen rods are clamped therein; and 4) welding the ends of the rings to one another.

The present invention, in accordance with yet another embodiment, comprises a generally "flat" (planar or arcuate) screen. The screen has a plurality of screen rods positioned in spaced parallelism so that screen slots are defined therebetween. A plurality of retaining bars are provided for supporting the screen rods. Each of the retaining bars has a plurality of recesses formed therein. The retaining bars are positioned in spaced parallelism, generally equidistant along the screen. The screen rods are clamped in the recesses in transverse direction of the retaining bars, whereby the screen is formed. The screen of this embodiment may be planar, or generally arcuate in shape.

The present invention, in accordance with a further embodiment, comprises a method for the manufacture of a planar or generally arcuate screen. The method comprises the following steps: providing a plurality of substantially elongated retaining rods having an inner surface and an outer surface, wherein each of the rods has a plurality of recesses formed along the inner surface; providing a plurality of screen rods for insertion into the recesses; aligning the retaining rods in spaced parallelism whereby the recesses are likewise aligned in spaced parallelism; bending the retaining rods in a direction opposite to the recesses so that the recesses are enlarged; inserting the retaining rods into the enlarged recesses by way of a transverse snap-in operation; and relieving the bending of the retaining rods whereby the screen rods are clamped in the recesses so that a screen is formed.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplification set out herein illustrates one preferred embodiment of the invention, in one form, and such exemplifications are not to be construed as limiting the scope of the invention in any manner.

DESCRIPTION OF THE PREFERRED EMBODIMENT

Figure 1:
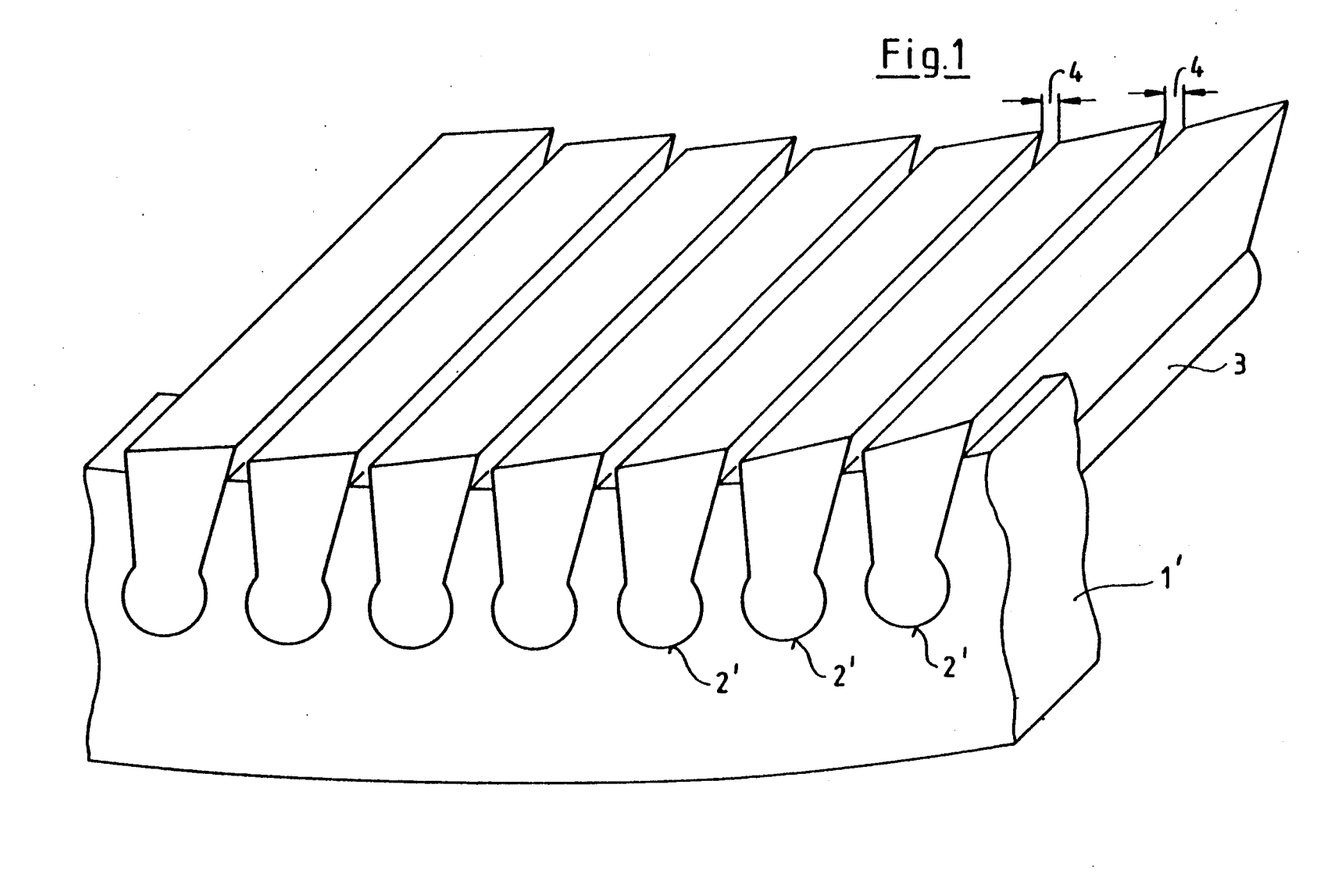
FIG. 1 illustrates a perspective view of a section of a screen basket according to the present invention.

FIG. 1 details a section of a retaining ring 1' for a screen basket. Retaining ring 1' features recesses 2' made, for example, by a wire type electrodischarge machining. Also depicted are profile bars, or screen rods, 3 which are slipped into the various recesses 2' in such a way that, when viewed in plan view, they will extend perpendicular to the ring section 1' and be situated parallel to one another. This leaves between adjacent bars 3 a space 4 which forms the screen slot.

As can be seen from the embodiment shown in FIG. 1, the ring section 1' represents part of a continuous ring which on its entire inner circumference features bars, or rods, 3 of the illustrated type.

Figure 2:
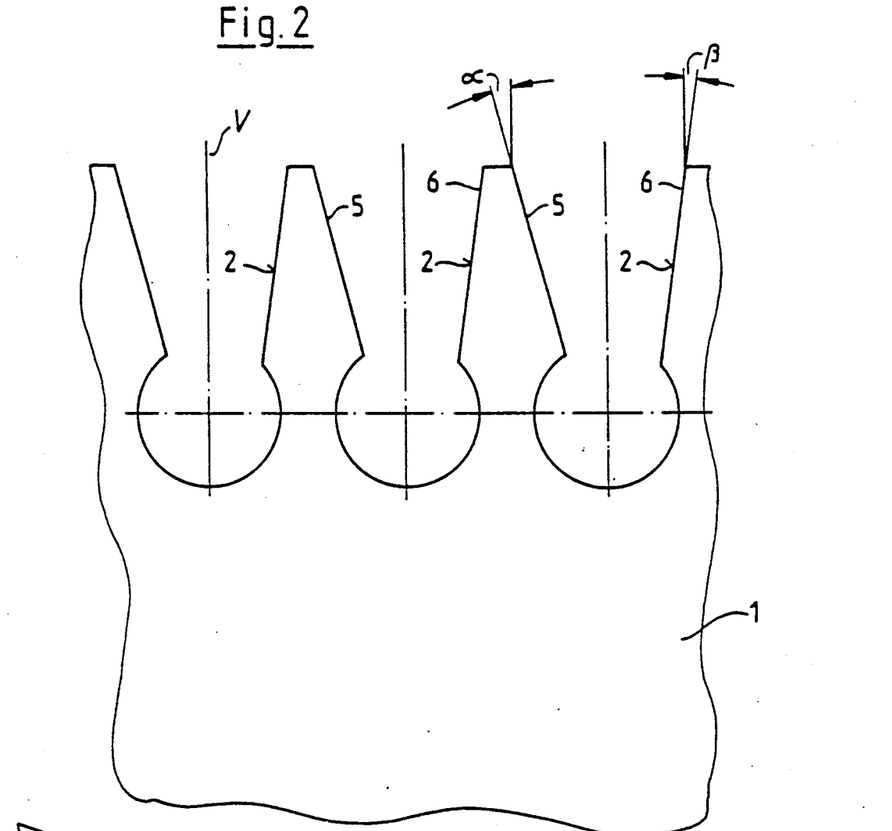
FIG. 2 illustrates a steel rod provided with recesses.

The ring section illustrated in FIG. 2 is shown in an early stage of its fabrication, namely that of a steel rod 1 that has not yet been rounded into a ring. However, the recesses 2 have already been completed, but not yet slightly deformed into recesses 2' of ring 1'. The side faces 5 and 6 of the recesses extend at specific angles—here $\alpha$ and $\beta$—to the vertical. Line "V" in FIG. 2 represents a center plane, or center axis of the profile cross section, of the screen rod. For economy of manufacture, several steel rods 1 are placed parallel and in contact with one another prior to electrodischarge machining, so that they will form a packet. Electrodischarge machining can now be performed on the entire packet, i.e., on a number of steel ross, in a single operation. The recesses in the retaining rods may also be accomplished by, for example, laser cutting.

Figure 3:
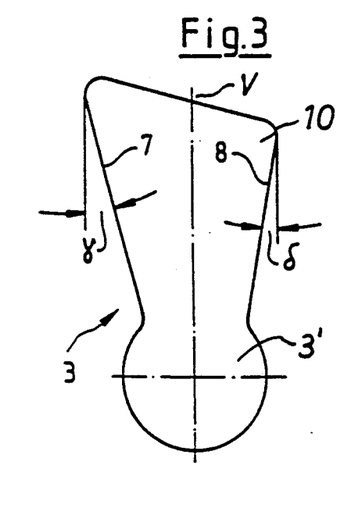
FIG. 3 illustrates a screen rod for insertion into a recess in the steel rod.
Figure 4:
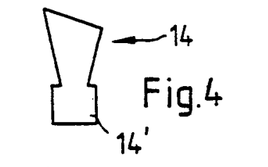
FIGS. 4-8 illustrate alternate configurations of the screen rod shown in FIG. 3.
Figure 5:
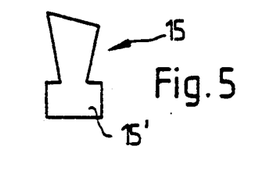
Figure 6:
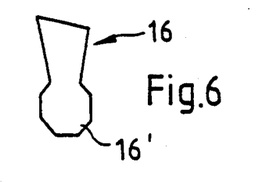
Figure 7:
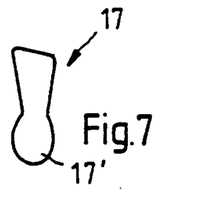
Figure 8:
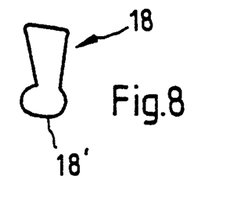
Figure 9:
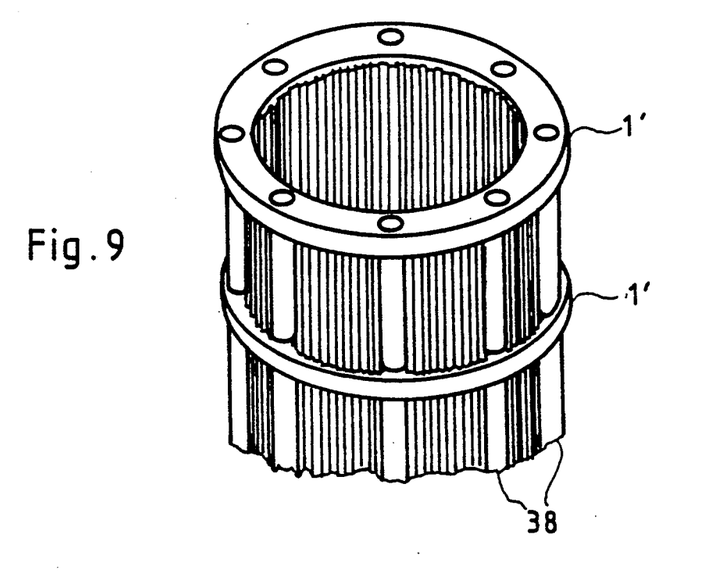
FIG. 9 illustrates a strainer basket according to an embodiment of the present invention showing coaxially aligned supporting rings 1', and showing reinforcement rods 38 that tend parallel to the screen rods.

The screen rod (profile bar) 3 illustrated in FIG. 3 is made, e.g., by an extrusion or drawing process. Its design is such that at any rate it can be inserted in the recess 2 in the steel rod 1 without difficulty, as long as the steel rod 1 has not been rounded yet to its final shape. As can be seen in this embodiment, the foot part 3' of the screen rod 3 is circular in cross section. FIGS. 4-8 show alternative configurations of the screen rod in cross section. The utmost part of the head part of screen rods 3, 14-18, that is, the part which protrudes out of the recess in the steel rod 1, sticks in the finished condition of the screen basket radially inward with respect to retaining ring 1' into the screen basket center and is of a design such as will be optimal for the technology of the dewatering or sorting.

Figure 11:
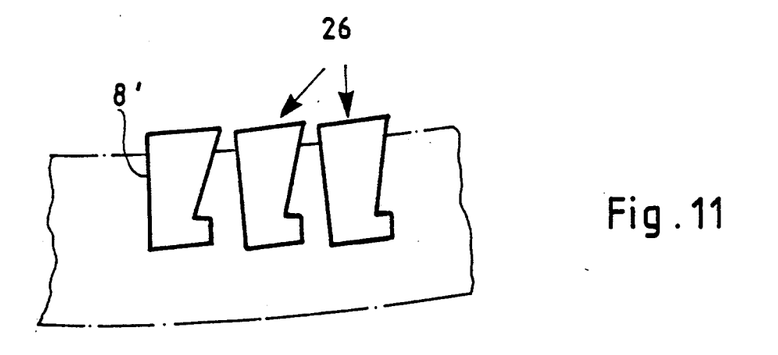

Here, too, it is evident again that the side surfaces 7, 8 of the head part form with the vertical a specific angle of inclination, presently the angles $\gamma$ and $\delta$. The cross-section of head parts 3, 14-18, respectively, substantially widens in this radially inward direction. The width, in circumferential direction or lengthwise of the rods 1, of the portion of the head parts adjoining the foot part is at least 0.6 mm less than the maximum width, in said direction, of the foot part. The side planes of the head part of screen rod 3 generally taper at angles of between approximately 7 to 18 degrees each, or by 14 to 35 degrees if only one side of the screen rod, is oblique (i.e. side 8' in FIG. 11).

As explained above, a preferred embodiment of the invention is based on the clamping of the screen rods 3 in the recesses 2, as a consequence of rounding the steel rods 1 until reaching a circular shape, so that the steel rods 1 finally will have the shape of continuous rings. In such rounding, the side faces 5, 6 of the electrodischarge machined recesses 2 approach each other, thereby pressing down on the corresponding side faces 7, 8 of the screen rods 3 and clamping them in place. Naturally, attention must be paid to not perform the clamping in excess, with the result of material destruction. Consequently, the said angles, i.e., $\alpha$ and $\beta$ on the side and $\gamma$ and $\delta$ on the other, must be adapted to one another appropriately. This means that the head part of the individual screen rod 3 that protrudes out of the recess 2 must in its condition of insertion in the recess 2 be somewhat slimmer than the funnel-shaped recess 2. How great the differences between the said angles will be, however, depends on various other circumstances, among others upon the selection of material. With appropriate materials selected for the screen rods 3 or the steel rods 1, the conditions may be highly variable. In the extreme case, for instance when selecting rubber or rubbery materials for the screen rods 3, it is even conceivable that the angles of the side faces 5 and 6 to the horizontal and the angles of the side faces 7 and 8 to the horizontal will be equally large.

The dimension in cross section of the foot, or root, portion 3', 14', 15', etc., of the screen rod 3, 14, 15, etc., in the longitudinal direction of the clamping rods deviates only by at most 7/100 mm from the corresponding dimension of the cross section of the grooves of the clamping rods so that a slight gap exists therebetween in the initial state, that is, prior to forming the rod into a ring. The dimension in the transverse direction deviates only by at most 2/100 mm from the corresponding dimension of the cross section of the grooves of the clamping rods so that a slight gap also exists therebetween in the initial state, prior to forming the rod into a ring. The bars are pushed lengthwise into the grooves, with the grooves acting as clamping recesses with respect to the foot portions of the profile bars in the initial state prior to forming the rods into rings.

The maximum dimension of the grooves in the lengthwise direction of the clamping rods is 2/1000th of the inner circumference of the rings. By using appropriate screen rods 3, 14, 15, etc., with corresponding dimensions in cross section a great number of screen rods can be used for building the screen basket, having an equal number of slots between them. As a result, a great throughflow area is provided as a so-called free screening area or screening space, taking into account that the slots may have a minute width of only 0.2 or 0.3 mm, as is often required.

Figure 10:
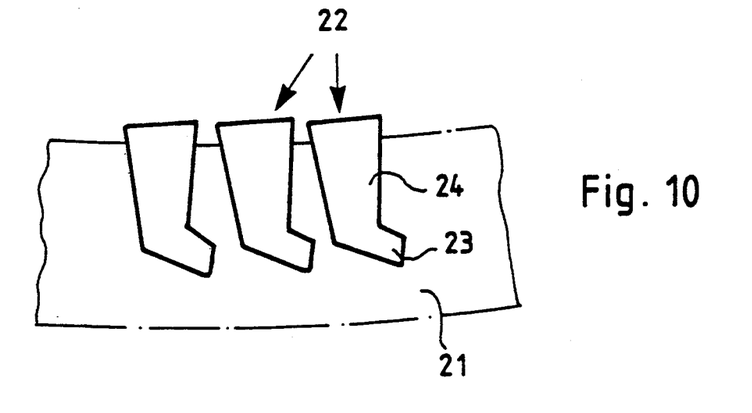
FIGS. 10-18 illustrate further embodiments of the present invention showing alternative configurations of the bars and recesses.

The dimension of the cross section of the screen rods 3, 14, 15, etc., at their radially inner portions in the longitudinal direction of the clamping rods, is relatively smaller than at the radially outer foot (root) portion 3', 14', 15', etc., in order to obtain a greater gap at the radially inner portion than at the radially outer portion in the initial state, prior to forming the rod into a ring. The maximal dimension of the cross section of the foot portion of the screen rods 3, 14, 15, etc., in the longitudinal direction of the rods is, by at least 0.6 mm, greater than the dimension of the cross section of the head part adjacent the foot portion. The cross section of the foot portion may also, for example, be substantially circular, rectangular, quadratic, elliptical or polygonal. Additional configurations are shown in FIGS. 10–17, such as the hook fashioned foot part shown in FIG. 10. In the embodiment of FIG. 10, screen rods 22 have respective foot parts 23 which extend sideways in hook fashion in relation to respective head parts 24.

Preferably, the cross section of the screen rods 3 is maximally 18 mm². Also, preferably the cross section of the recesses 2' is maximally 16.5 mm². The largest dimension of the screen rods 3 in the peripheral direction is preferably 3.8 mm. In an embodiment of the invention, the recesses 2' in which the screen rods 3 are clamped in place, feature in the clamping area, across at least 70% of the length of their cross sectional rim, the same cross section as the screen rods 3.

Generally, the clamping rings are substantially straight rods having the grooves formed therein. The screen rods are inserted into the grooves so that a screen mat is produced. The ends of the screen mat are then brought together, rounding the screen mat. The ends of the screen mat are then welded to one another. As a result, the rods are formed into a ring, thereby forming a screening basket consisting of screening bars and clamping rings, forming a rigid screen structure. Centering rings may then be shrink-fitted to the end faces of the screen basket.

Alternatively, it is also conceivable that the manufacture of the rings not be based on steel rods, but rather on other bodies that are already prerounded. It is only important that the rings are not yet completely rounded prior to insertion of the bars, that is, that they not yet form continuous rings.

Figure 12:
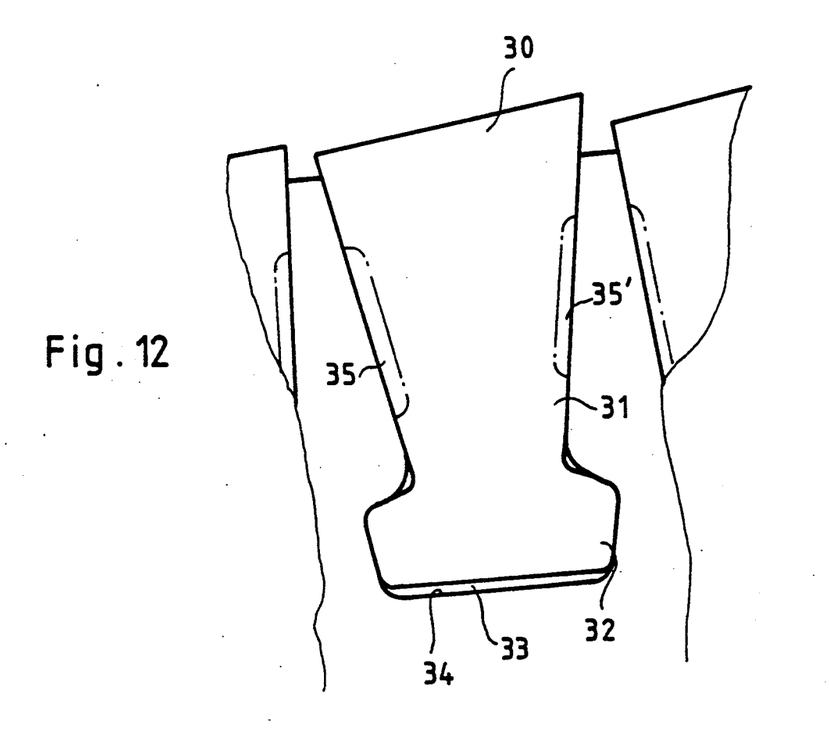

In the embodiment shown in FIG. 12 the head part of the screen rods 3 features recesses 35, 35' in its side surfaces that are essentially straight and extend slanted to the radial center line of the screen rods. There are no corresponding bearing surfaces in the recesses 2, 2' of the bars 1 or of the holder or support rings 1' to these side surfaces, so that in that area no clamping will take place.

Figure 14:
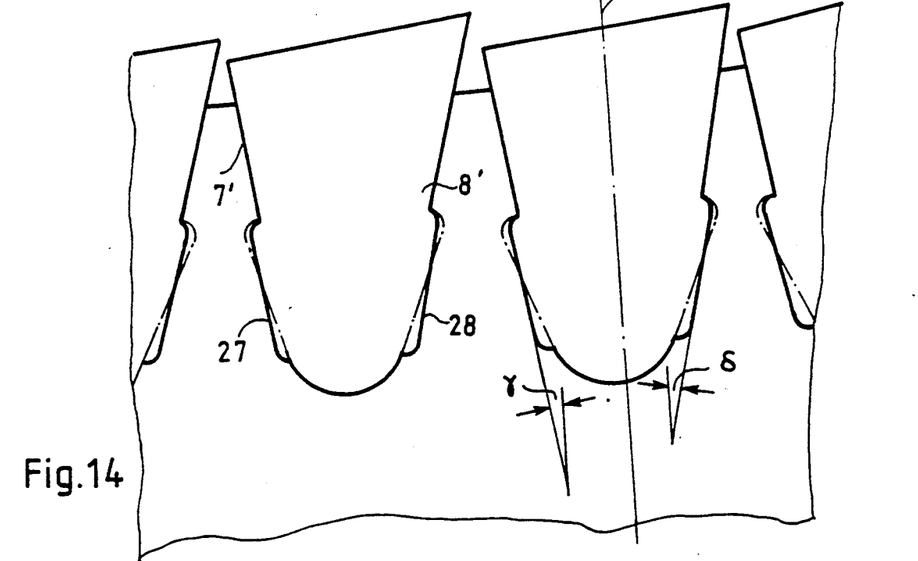

Essentially straight and tilted to the radial center line of the screen rods, the side surfaces 7', 8' of the head parts may be tilted at the same angles ($\gamma$ and $\delta$) relative to the radial centerline of the screen rod cross sections, the same as similar side surfaces 27, 28 of the foot parts (FIG. 14).

Figure 13:
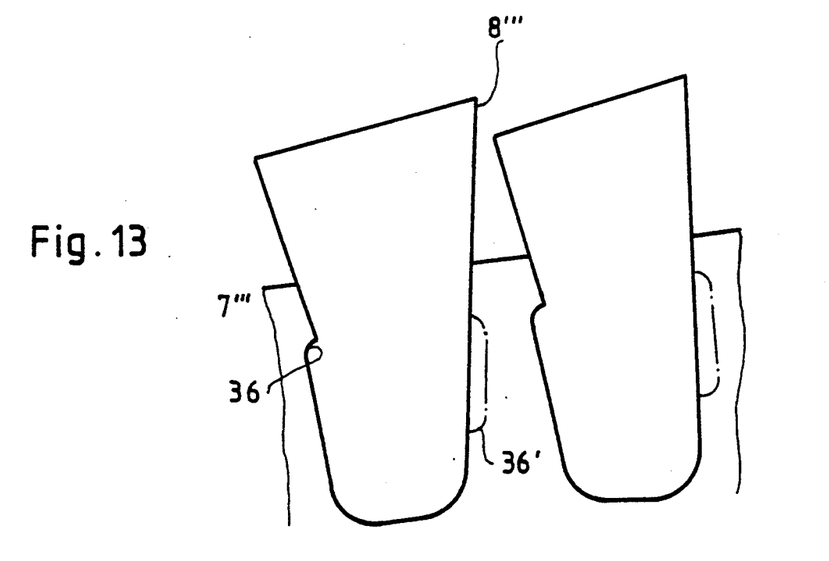
Figures 15, 16:
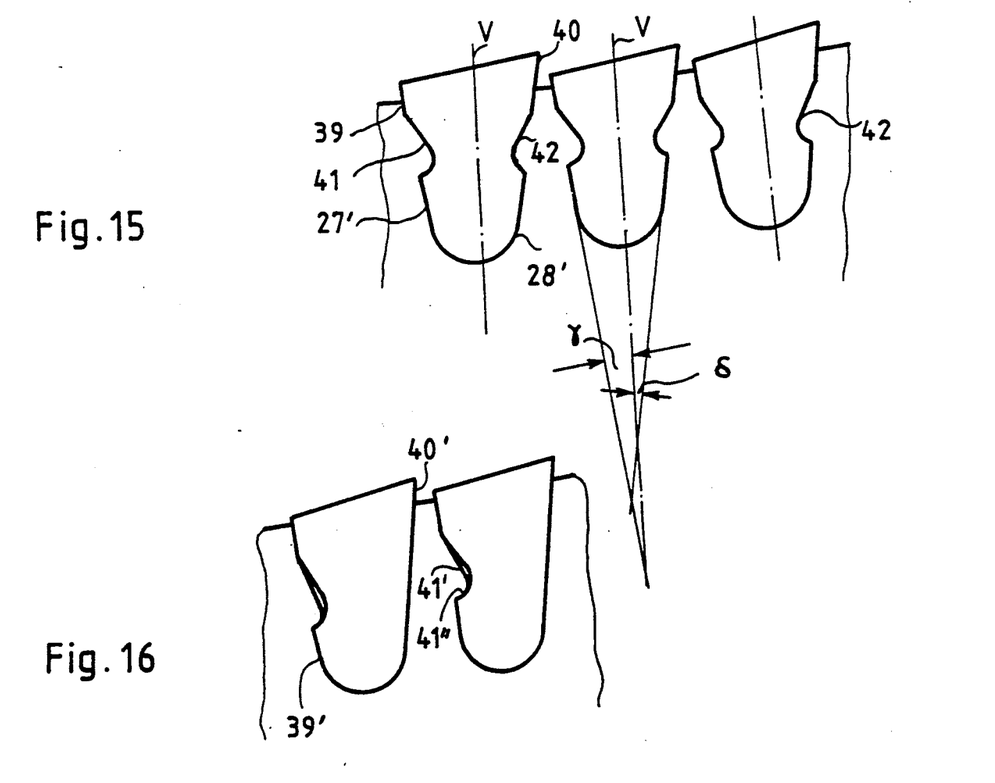

In a further embodiment, the screen rods have side surfaces which in relation of the radial center line of their cross section are tilted in such a way that the cross section decreases essentially uniformly from radially inside to radially outside. These side faces feature either recesses or projections on one or both sides to the said radial center line (FIGS. 13, 15 and 16). The projections 36, 36' in FIG. 13, or recesses such as 41, 42 in FIG. 15, of the screen rods serve to hold them in the rods 1 in the clamping process of the screen rods. In a preferred embodiment, at least 70% of the periphery of the cross section of the recesses of the rings 1' corresponds exactly to the cross section of the screen bars 3 in the corresponding (clamping) area.

In a preferred embodiment, the screen rods 3 may be inserted into the recesses 2, 2', etc., by plugging them into the recesses in a direction transverse to the retaining rings. The screen rods are then retained in the recesses in the manner of a catchlock, one after the other. This embodiment may be best visualized by the embodiment shown in FIG. 16. A protrusion 41' extending from the recess of the retaining rod snaps into a corresponding recess 41'' of the screen rod. Recess 41'' of the screen rod (or the protrusion 41' of the recess of the retaining rings), should preferably have a dimension in the longitudinal direction of retaining rod 1 of only about 0.3 to 0.5 mm so that the individual "tooth" of the rods, which is formed between two recesses of them, is not too much deformed when the screen rod is plugged in. The embodiment shown in FIG. 16 is preferred for this plug-in operation, however two protrusions (or recesses, respectively) one on each side of the screen rods, may similarly be utilized as shown in FIGS. 13–15. However, two protrusions (recesses) may be too bulky for an easy plug-in operation in certain applications when compared to the embodiment shown in FIG. 16, the latter embodiment is generally preferred. However the embodiments of FIGS. 13–15 are also generally suited for the purposes of the present invention.

In the embodiment shown in FIG. 16, the protrusion 41' of the retaining rod 1, and the recesses 41'' in the screen rod only partially match, which fact is maintained after bending the rods into rings. The matching area, however, is so selected that the screen rod is retained in the recess of the retaining rod in the exact radial position until completion of the screen basket.

Figure 17:
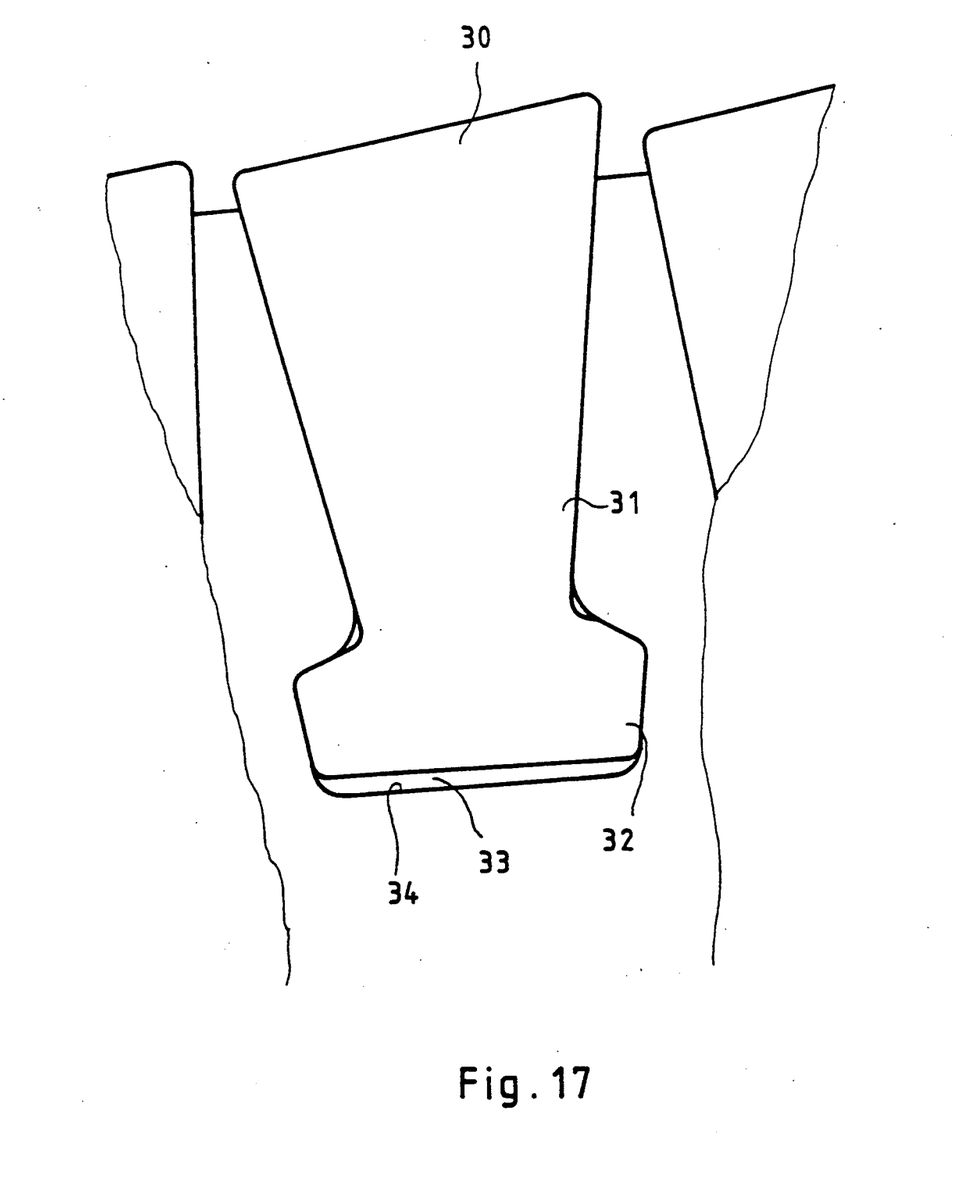

In the embodiment shown in FIG. 17, at the transition of head part 31 and foot part 32, the cross section of the recess 33 does not match with the cross section of the bar 30, likewise at the bottom line 34.

All of the embodiments shown in FIGS. 13-16 are also suited for forming a "flat" screen, that may be planar or have a generally arcuate shape. An embodiment showing the arcuate shape is shown in FIG. 19. The embodiments having a "flat" screen may also operate by a plug-in or snap-fit of the screen rod into the retaining rod. The cross section of the screen rods need not be slimmer than the recesses of the retaining rods. The cross sections and all dimensions specified hereinbefore of the screen rods may be much larger in this embodiment, and the cross sectional dimensions of the recesses may be 2/100-1/10 mm smaller than those of the screen rods in the clamping area. Clearances may be equal to, or much larger, than with a screen basket. It may be preferable, as also with very large screen baskets, to initially bend straight retaining rods 145 (FIGS. 18, 19) in the opposite direction with respect to their ultimate curvature, in order to enlarge (widen) the recesses formed therein to facilitate the insertion of the screen rods 144 by transverse snap-in operation as described. Afterwards the rods are reflexed (for example by relief of the bending strain) and thus the screen rods are firmly clamped in the retaining rods in the case of a planar screen, or the rods flex in the opposite direction to form a screen basket or an arcuate "flat" screen as shown in FIG. 19. The embodiment shown in FIG. 19 also shows transverse girder rods 146.

Figure 18:
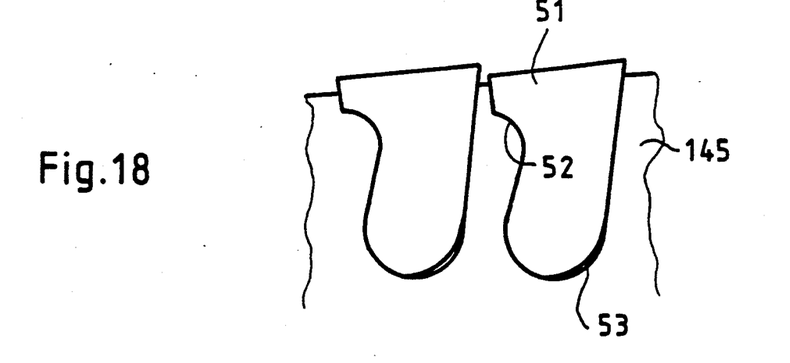
Figure 19:
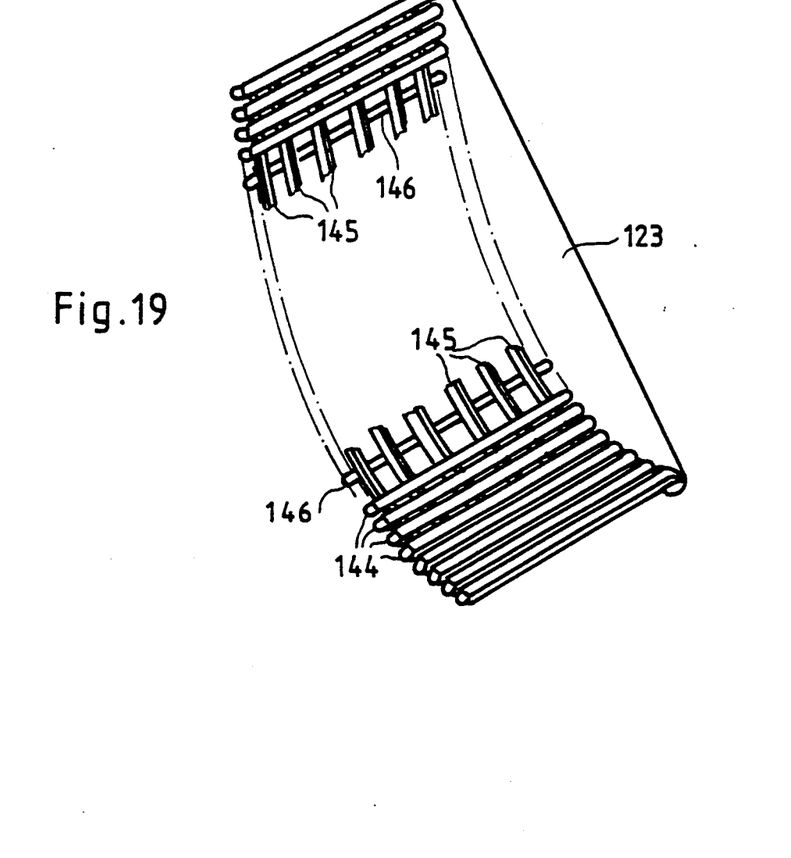
FIG. 19 illustrates another embodiment of the present invention, showing a screen having generally arcuate retaining bars.

The embodiment shown in FIG. 18 is most appropriate for snap-in operation with flat screens (planar), showing recesses 52 on one side of the screen rods 51, in "reverse" configuration with respect to FIGS. 15 and 16, and with a gap 53 at the innermost part of the bars with respect to the retaining rods 145.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A screen basket having an axis, comprising:
a plurality of screen rods, said screen rods being aligned so that screen slots are defined therebetween, said screen rods extending generally along a cylinder circumference surface of said basket and being axially parallel to the center axis of said basket, each of said screen rods having a radially outer foot part and having a head part projecting radially inwardly from said foot part, each of said head parts including a transition part wherein the head part is joined to the foot part, each of said head parts further having respective side surfaces which are tilted between about 7 degrees to about 18 degrees relative to the respective radial of the screen basket, said head parts having respective cross sectional dimensions in circumferential direction whereby said cross sectional dimensions increase in the radially inward direction, said transition parts and said foot parts having respective cross sectional dimensions in circumferential direction wherein the cross sectional dimension of each of said transition parts is at least 0.6 mm less than the maximum cross sectional dimension of the foot parts; and
a plurality of retaining rings supporting said screen rods, said rings having an inner rim and extending peripherally around said cylinder circumference surface, said rings being mutually spaced and generally coaxial to said axis, said rings being provided with recesses which open toward said rim, said recesses having said foot parts positioned therein.

2. The screen basket of claim 1, in which each of said foot parts is joined to a respective head part, wherein each said foot part represents an expansion in relation to the portion of each of the side surfaces adjoining the foot part.

3. The screen basket of claim 1, wherein each said foot part is angled over in hook fashion from the head part, essentially in circumferential direction.

4. The screen basket of claim 1, wherein the cross section of said screen rods is maximally 18 $mm^2$.

5. The screen basket of claim 1, wherein the cross section of said recesses is maximally 16.5 $mm^2$.

6. The screen basket of claim 1, wherein the largest dimension of said screen rods in the circumferential direction is 3.8 mm.

7. The screen basket of claim 1, wherein said recesses feature, across at least 70% of the length of their cross sectional rim, the same cross section as said screen rods.

8. The screen basket of claim 1, wherein said retaining rings are formed from bodies whereby said bodies are rounded into said rings.

9. The screen basket of claim 8, wherein said rings are formed from steel strips, said steel strips having said recesses formed therein by electrodischarge machining before said strips are rounded into rings.

10. The screen basket of claim 9, in which said recesses have respective side surfaces and said screen rods have a longitudinal axis, wherein said recess side surfaces extend parallel to said longitudinal axis, said side surfaces of said screen rods being positioned so that said screen rod side surfaces face toward said recess side surfaces.

11. The screen basket of claim 10, wherein an area defined by a cross section of said screen rod between said screen rod side surfaces is less than an area of said recess defined by said recess side surfaces so that clamping forces occurring during the rounding of the strips into rings are reduced.

12. The screen basket of claim 1, wherein the respective side surfaces of said head part of the screen rods include recesses, said recesses being generally straight and extending slanted to the radial center lines of the respective screen rods, said recesses of the retaining rings being devoid of bearing surfaces corresponding to said side surfaces so that clamping does not occur in the region of said screen rod recesses.

13. The screen basket of claim 1, wherein essentially straight and tilted to the radial center line of the screen bars, the side surfaces of the head parts are tilted at the same angles relative to the radial center line of the screen rod cross section, the same as similar side surfaces of the foot parts.

14. A screen basket having an axis, comprising:
a plurality of screen rods, said screen rods being aligned so that screen slots are defined therebetween, said screen rods extending generally along a cylinder circumference surface of said basket and being axially parallel to the center axis of said basket, each of said screen rods having a radially outer foot part and having a head part projecting radially inwardly from said foot part, each of said head parts including a transition part wherein the head part is joined to the foot part, said head parts further having respective side surfaces wherein only one of said side surfaces is tilted relative to the respective radial of the screen basket, said side surface being tilted between about 14 degrees to about 35 degrees, said head parts having respective cross sectional dimensions in circumferential direction whereby said cross sectional dimensions increase in the radially inward direction, said transition parts and said foot parts having respective cross sectional dimensions in circumferential direction wherein the cross sectional dimension of each of said transition parts is at least 0.6 mm less than the maximum cross sectional dimension of the foot parts; and plurality of retaining rings supporting said screen rods, said rings having an inner rim and extending circumferentially around said cylinder circumference surface, said rings being mutually spaced and generally coaxial to said axis, said rings being provided with recesses which open toward said rim, said recesses having said foot parts positioned therein.

15. A screen basket having an axis, comprising:
a plurality of screen rods, said screen rods being aligned so that screen slots are defined therebetween, said screen rods extending generally along a cylinder circumference surface of said basket and being axially parallel to the center axis of said basket; a plurality of retaining rings extending along the cylinder circumference surface for supporting said screen rods, said rings being formed from bodies whereby the bodies are rounded into rings, said rings being coaxial to said axis and being spaced generally equidistant along said axis, each of said rings further having an inner rim and being provided with recesses which open toward said rim; said screen rods being adapted to be placed in said recesses prior to said rounding of the rings so that the rods are clamped into position in said recesses, each of said screen rods having side surfaces, at least one of said side surfaces being tilted in relation to the radial center line of the cross sections of the screen rod such that the cross section decreases generally in a uniform manner from radially inside to radially outside, said side surfaces including either recesses or projections on one or both sides to said radial center line.

16. The screen basket of claim 15, wherein said recesses or projections on the side surfaces of the screen rods are adapted to hold the screen rods in said recesses during the rounding of said rings.

17. The screen basket of claim 15, wherein the cross sections of the recesses of the retaining rings corresponds to at least 80% of the cross sections of the screen rods.

18. The screen basket of claim 15, wherein the depths of said projections or recesses in relation to the side surfaces tilted to the radial center line amounts to 0.3 mm each.

19. Arrangement on a screen basket featuring screen rods (3) that extend along a cylinder circumference surface, parallel to the center axis of the cylinder, and form between themselves screen slots (4), said screen rods being held by clamping in recesses (2') of support ribs (1') that extend in the peripheral direction of the cylinder circumference surface at an axial, mutual spacing, characterized in that said screen rods (3) are clamped in place in recesses (2') wherein at least 70% of the periphery of the cross section of said recesses of the rings corresponds exactly to the cross section of the screen rods in the corresponding area, in that each screen rod consists of a foot part (3', 14' through 15') and a radially inward pointing head part (10), in that the head part features side surfaces which relative to the respective radial of the screen basket are tilted 7° to 18° so that the cross section of the head part increases radially inwardly or that the screen basket's sole correspondingly tilted side surface is tilted 14° to 35° relative to the radial, and that said head part (10) has at the transition to the radially outer foot part of the screen rods (3) in peripheral direction a cross-sectional dimension which is at least 0.6 mm smaller than the maximum dimension of the foot part cross section in peripheral direction.

20. A screen basket having an axis, comprising:
a plurality of screen rods, said screen rods being aligned so that screen slots are defined therebetween, said screen rods extending generally along a cylinder circumference surface of said basket and being axially parallel to the center axis of said basket; a plurality of retaining rings extending along the cylinder circumference surface for supporting said screen rods, said rings being formed from bodies whereby the bodies are rounded into rings, said rings being coaxial to said axis and being spaced generally equidistant along said axis, each of said rings further having an inner rim and being provided with a plurality of recesses which open toward said rim, said recesses having respective inner faces; said screen rods being adapted to be placed in said recesses prior to said rounding of the rings so that the rods are clamped into position in said recesses, each of said screen rods having respective side surfaces which in relation to the radial center line of the cross sections of the screen rod are tilted such that the cross section decreases generally in a uniform manner from radially inside to radially outside; said side surfaces of said screen rods further having one of recesses or projections on one or both sides of said radial center line, and said inner faces of said recesses having the other of recesses or projections, wherein said side surface recesses or projections are mated in snap-fit relationship with corresponding projections or recesses on said inner face recesses.

21. The screen basket of claim 20, wherein the cross sections of the recesses of the retaining rings corresponds to at least 70% of the cross sections of the screen rods.

22. A process for the manufacture of a rotationally symmetric screen basket, said screen basket having axially parallel screen rods aligned so that screen slots are defined therebetween, said basket further having an axis and including rings for support of said screen rods, said rings being coaxial with said axis, each of said rings having an inner rim and being provided with a recess which opens toward said rim, said screen rods being positioned and fastened in said recesses, said process comprising:
providing substantially elongated retaining rods to be rounded into said rings, said retaining rods having said recesses formed therein;

placing said screen rods into said recesses prior to rounding said retaining rods into rings, said screen rods being placed in said recesses by inserting the screen rods into said recesses in transverse direction with respect to said retaining rods one after the other by plugging them into the recesses of all the rods so that the screen rods are retained in said recesses as a catchlock;

rounding said retaining rods into rings so that said recesses are narrowed, whereby the screen rods are clamped therein; and welding the ends of the rings to one another.

23. A generally flat screen, comprising:

a plurality of screen rods, said screen rods being positioned in spaced parallelism and defining screen slots therebetween;

a plurality of retaining bars for supporting said screen rods, said retaining bars being positioned in spaced parallelism and being spaced generally equidistant along said screen, each of said retaining bars being provided with a plurality of recesses formed therein, said screen rods being clamped in said recesses in transverse direction of said retaining bars so that a generally flat screen is defined thereby.

24. The screen of claim 23, wherein said screen is generally planar.

25. The screen of claim 23, wherein said screen is arcuate.

26. The screen of claim 23, in which said screen rods are positioned in said recesses by way of a snap-fit.

27. A process for the manufacture of a screen, comprising:

providing a plurality of substantially elongated retaining rods, each of said retaining rods having an inner surface and an outer surface, each of said retaining rods further having a plurality of recesses formed along said inner surface;

providing a plurality of screen rods for insertion into said recesses;

aligning said retaining rods in spaced parallelism whereby said recesses are likewise aligned in said spaced parallelism;

bending said retaining rods in a direction opposite to said recesses so that said recesses are enlarged;

inserting said screen rods into said enlarged recesses by way of a transverse snap-in operation;

relieving the bending of the retaining rods whereby the screen rods are clamped in said recesses so that a screen is formed thereby.

* * * * *

UNITED STATES PATENT AND TRADEMARK OFFICE
CERTIFICATE OF CORRECTION

PATENT NO. : 5,094,360

DATED : March 10, 1992

INVENTOR(S) : Werner Lange

It is certified that error appears in the above-identified patent and that said Letters Patent is hereby corrected as shown below:

Claim 19, Column 10, Line 8, delete "15'" and substitute therefor --18'--.

Signed and Sealed this

Twenty-first Day of September, 1993

Attest:

BRUCE LEHMAN

*Attesting Officer*  *Commissioner of Patents and Trademarks*